United States Patent Office 3,228,636
Patented Jan. 11, 1966

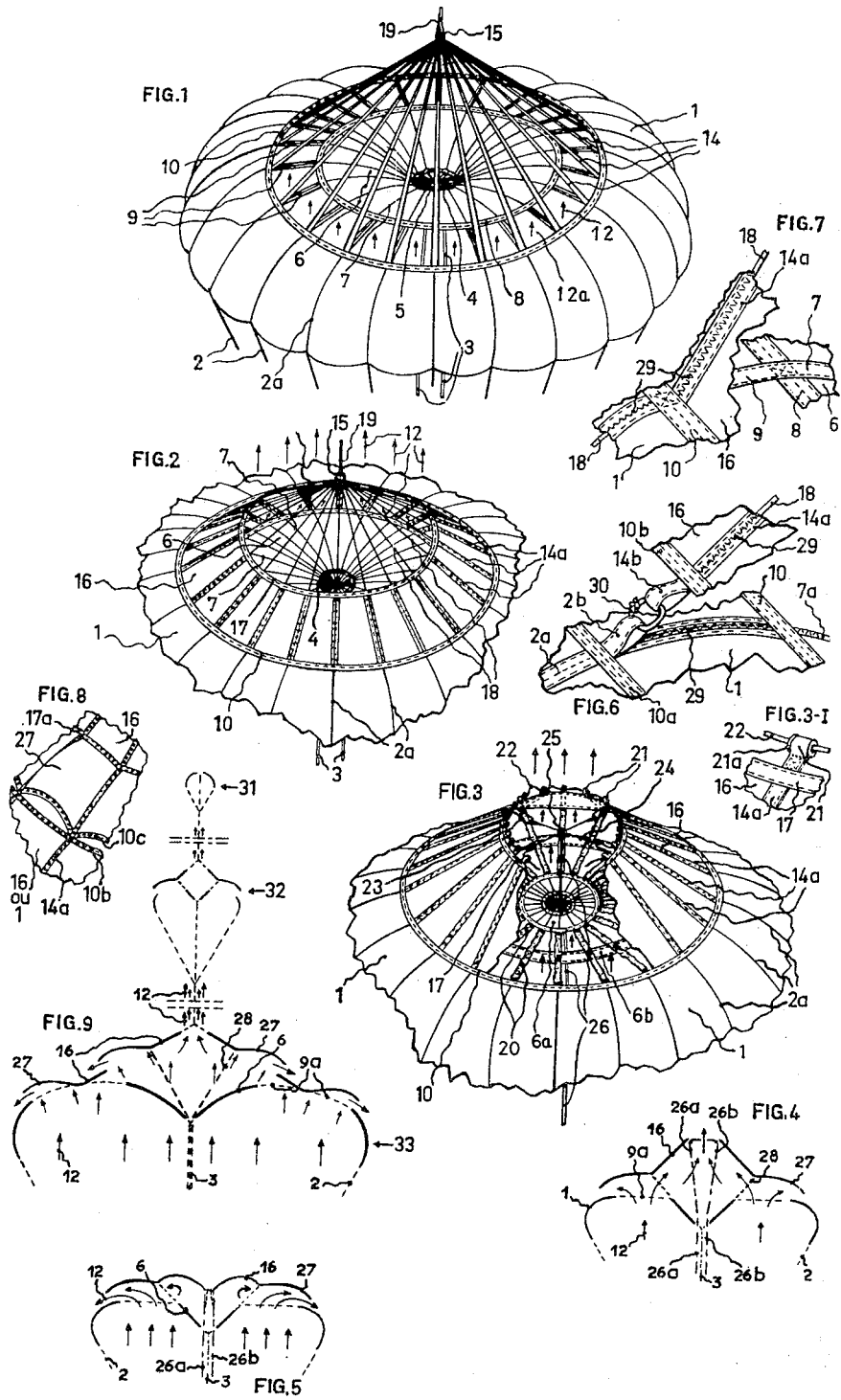

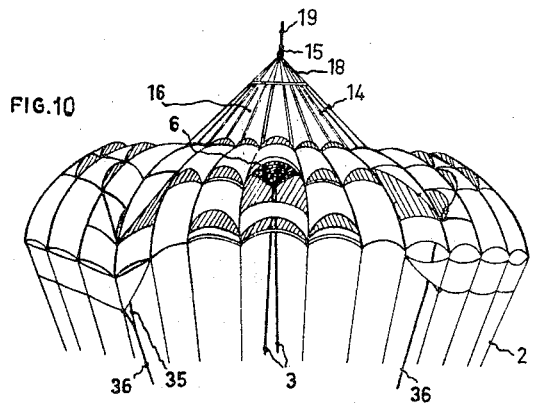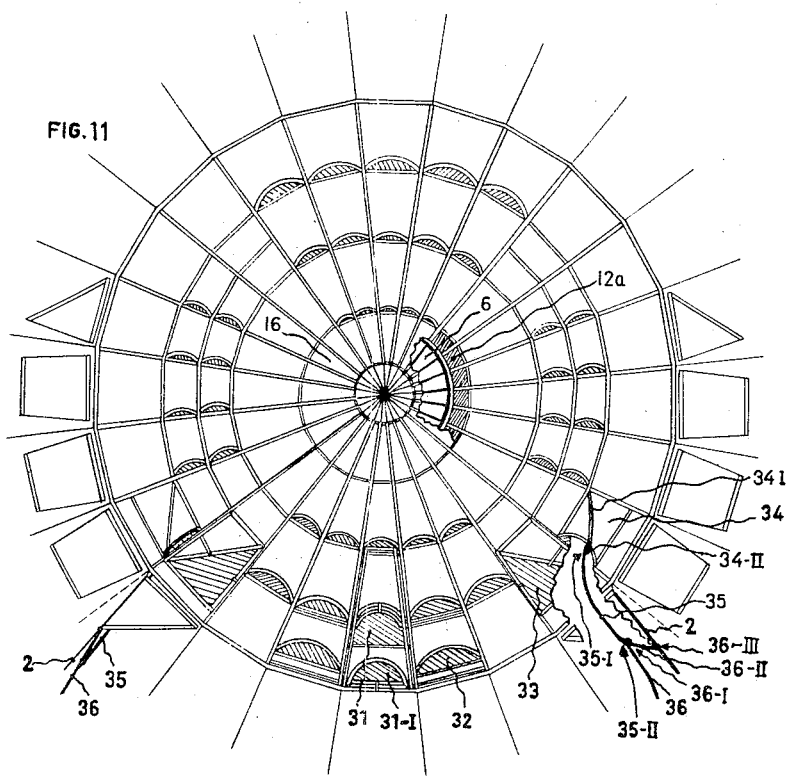

3,228,636
PARACHUTE
Pierre Marcel Lemoigne, 103 Ave. Verdier,
Montrouge, Seine, France
Filed Nov. 7, 1963, Ser. No. 322,231
Claims priority, application France, Nov. 14, 1962,
915,315
7 Claims. (Cl. 244—145)

This invention has as its general objects to improve the stability and safety of parachutes and to impart improved features of manoeuvrability whereby the path of descent of a parachute will be controllable to a large extent both as to the angle and direction of the glide path and the speed of descent.

The invention is directed to the class of parachutes in which the parachute canopy in addition to being provided with the usual peripheral rigging or shroud lines depending from circumferentially spaced points on the periphery of the canopy is also provided with central shroud lines attached to a central area of the canopy so as impart to such central area the general shape of an inverted cone, with its apex directed downwardly. Parachutes of this general type are known to possess considerable advantages especially in that the spread of the canopy is greatly increased, i.e. the effective area of the canopy as projected on a horizontal plane is substantially larger than would be the case for a canopy of equal dimensions not provided with the central or inner shroud lines. Thus the rate of descent for a given load attached to the parachute is correspondingly reduced.

However, conventional parachutes of the centrally shrouded type have no less important drawbacks which have rendered them inapplicable in many cases, as for dropping heavy loads. Such parachutes are conventionally provided with a central vent at the apex of the central inverted cone portion of the canopy, and the central shroud lines are attached around such vent. On initial opening of the parachute, the dynamic airflow finds difficulty in escaping fast enough through the central vent and creates a violent impact which is mainly applied against the annular area of the under-surface of the canopy at which the inner inverted cone portion merges with the surrounding annular dome portion of the canopy. To reduce this impact it would be necessary to increase the area of the central vent, but this cannot be done to an effective degree without endangering safe, unfurling of the parachute. It is a specific object of the invention to reduce the impact on opening of a parachute of the class described while still assuring safe, full unfurling of the canopy. This object is mainly achieved according to the invention by providing the main vent of a centrally shrouded parachute in the annular connecting region between the central inverted cone and the surrounding dome portion, thereby facilitating the discharge of the impact airstream.

With the vent positioned centrally as in the conventional arrangement, the escape of air during parachute descent occurs at a point substantially lower than the uppermost surface of the canopy in view of the inverted-conical shape of the central part of the canopy in parachutes of this class. This is detrimental to the stability of the parachute during descent. The provision of an annular vent positioned as above described according to the invention therefore accomplishes the further object of improving parachute stability.

Other objects of the invention include the provision of simple and strong interconnecting means between the central and peripheral canopy portions of a parachute provided with an annular vent between said portions according to the feature of the invention first referred to; the provision of improved means for connecting the canopy of the parachute with parachute-extractor means or with an auxiliary, pilot parachute; the provision of an outlet cone member having its base circumference surrounding the annular vent and having a vent opening in its upwardly directed apex for channeling the upward airflow from the annular vent in the canopy and contributing to the safe opening and descent of the parachute especially in that it prevents the creation of localized overpressures, e.g. by "shock bubble" effect as the canopy unfurls.

According to further objects and features of the invention, there are provided additional laterally directed vents in the canopy, serving to create an airflow along the upper canopy surface and capable of acting as high-lift nozzles. Such laterally directed vents may according to the invention also be used to generate a lateral thrust component by the jet reaction of the airstream issuing therethrough, so as to cause the parachute to descend at an angle to the vertical. Means are preferably provided for controlling the effective flow section area of one or more of such laterally directed vents, and/or that of the central vent of the afore-mentioned outlet cone member, if used, thereby to control the direction and angle of the glide path followed by the parachute, as well as the descent velocity, to a substantial degree. The invention in this aspect makes it possible to increase the manoeuvrability of a parachute to such an extent that the parachute can actually be steered throughout its descent, and turns may be performed, with a flexibility and precision unattainable heretofore.

The various objects and features of the invention will become apparent from the ensuing disclosure relating to exemplary embodiments of the invention selected by way of illustration but not of limitation and illustrated in the accompanying drawings, wherein:

FIG. 1 is a perspective view from above, showing the canopy of a parachute provided with an annular vent in accordance with a principal feature of the invention;

FIG. 2 is a partial view generally similar to FIG. 1 showing a modification including an outlet cone member extending upwardly from the canopy around the annular vent therein;

FIG. 3 is a view similar to FIG. 2 showing a modification in which the apical vent of the outlet cone is provided with means for controlling its section area;

FIG. 3–I is a detail view on an enlarged scale illustrating a part of the means for controlling the section area of the vent in the outlet cone of FIG. 3;

FIG. 4 is a simplified view in vertical section showing a parachute canopy provided with an annular canopy vent and an outlet cone according to the invention, and further including laterally directed canopy vents, the outlet cone being shown extended so that its central vent is open;

FIG. 5 is similar to FIG. 4 but shows the outlet cone collapsed and its central vent substantially sealed;

FIG. 6 is a large-scale, fragmentary, perspective view illustrating one manner of connection between the canopy and the outlet cone member, wherein the base circumference of the outlet cone is spaced from the surface of the canopy;

FIG. 7 is similar to FIG. 6 but shows a different type of connection wherein the base circumference of the outlet cone member is directly connected with the canopy surface;

FIG. 8 is a large-scale fragmentary perspective view illustrating the construction of a laterally directed vent aperture, which may be provided in the canopy, or in the outlet cone;

FIG. 9 is a schematic vertical sectional view of a three-stage parachute system including a main parachute and an auxiliary parachute both constructed according to the invention and a third pilot parachute, all three co-operating during descent;

FIG. 10 is an elevation of the upper part of a parachute according to the invention provided with laterally directed canopy vents of controllable section to control the glide path of the parachute; and FIG. 11 shows the same parachute as in FIG. 10 in flat, developed view.

Illustrated in FIG. 1 is an improved parachute canopy including an annular mainsail 1, a central sail section 6 in the form of an inverted cone, and an annular vent section 12a between, and connecting, the mainsail and central canopy sections. Attached to points spaced around the periphery or leading edge of the mainsail 1 are the upper ends of peripheral rigging or shroud lines 2, and these are extended upwardly by peripheral shroud-tapes 2a extending along and reinforcing the junctions between the segmental gores constituting the mainsail 1.

Attached around the apex of the central conical sail 6 are the upper ends of central shroud lines 3. In the illustrated embodiment the central sail 6 is formed in its apical portion with a small-diameter central vent aperture 4, which facilitates the attachment of the central shroud lines 3 therearound but participates to only a small or negligible extent in the actual venting of air through the canopy, and which may well be omitted. Reinforcing tapes or webs 7 extending along the junction lines between the adjacent gores making up the central sail 6 are provided as extensions of the central shroud lines 3.

The upper base periphery of the central sail 6, constituting the trailing edge of said sail, is provided with a circular reinforcing tape 8, which defines the inner edge of the annular vent 12a. Similarly the inner, upper or leading periphery of the mainsail 1 is provided with a reinforcing tape or web 10 defining the outer edge of annular vent 12a. The mainsail and central sail of the canopy are interconnected across the annular vent 12a by means of a series of radial bridging tapes or webs 9 provided with longitudinal reinforcing ropes, and having their opposite ends attached to spaced points of the circular tapes 8 and 10 respectively. The tapes 9 serve to maintain a substantially constant width of the annular vent 12a and are preferably provided as intermediate sections of continuous tapes of webbing integrally including the peripheral shroud tapes 2a and the central shroud tapes 7 as end sections thereof.

It will be understood that with a parachute canopy constructed as so far described, the venting of air during descent is effected in the uppermost portion of the parachute canopy, a condition favorable for stability. The air, channelled upwardly along the under surfaces of the mainsail and the central sail 6, escapes at high velocity through the annular vent as indicated by the arrows 12. The airflow is considerably smoother and more effective than that occurring through the central vent of a conventional parachute of the type comprising central shroud lines, and the initial escape of air on unfurling is facilitated, reducing impact.

While in FIG. 1 the radial width of the annular vent 12a has been somewhat exaggerated for clarity, it should nevertheless be understood that the flow cross section area of such annular vent according to the invention may be made several times larger than the arear of a conventional central vent while ensuring a smooth unfurling of the canopy together with a normal parachute-opening time, and low descent velocity.

The embodiment shown in FIG. 1 further includes a set of ropes, tapes or halyards 14 having their outer ends conencted to the outer tape 10 reinforcing the outer perihery of annual vent 12a, and their inner ends all connected to a ring 15 having connected thereto by way of a line 19a conventional extractor device, not shown, such as an automatic release wire or/and a pilot parachute. The group of ropes or halyards 14 provides a means of folding the canopy, by means of the ring 15, in a manner similar to that used in folding the canopies when packing a conventional parachute of the type having no central shroud lines.

In the modification of the invention partially illustrated in FIG. 2, the general arrangement is similar to that of FIG. 1. In addition, however, this embodiment includes an outlet cone extending upwardly from the outer periphery of the annular vent 12a and made up from a plurality of trapezoidal panels or goes of fabric 16 joined at their sides. This outlet cone structure stabilizes the airflow 12 from out of the annular vent 12a while accelerating its velocity. The lateral junction between the adjacent panels 16 is reinforced by means of tapes 14a (see e.g. FIGS. 6 and 7), and ropes, herein designated 18, are secured to said tapes by way of zigzag stitches 29, said ropes as earlier described for the ropes 14, being all grouped at their upper ends at a common central ring 15 for the purpose earlier indicated.

The further modification shown in FIGS. 3 and 3-I is chiefly characterized in that means are provided for controlling the effective flow section area through the outlet cone 16, and connected with the upper end of trailing edge 17 of the cone. As shown, the annular upper edge 17 of the outlet cone is provided with spaced loops 21, preferably formed integrally with the outer ends of the tapes 14a, and fitted with tubular guide elements 21a therein, made from a material having very low friction properties. Threaded through all the tubular guides 21a as a running loop is an outlet-control line 22. By way of loops 21 integral with the line 22 there are attached to said line the upper ends of halyards 24, having their inner ends connected to a common control halyard 26, the lower end of which is led down to the parachute harness. Action on the control halyard 26 during descent modifies the degree of opening of the upper end of the outlet cone as will be readily apparent.

Thus FIG. 4 shows in schematic section the outlet cone in fully open condition, while FIG. 5 shows the same outlet cone collapsed as a result of a pull exerted on the lower end of control line or halyard 26. It will be seen that the apex of the outlet cone is substantially shut off as might be the mouth of a canvas bag. The arrangement thus described makes it possible for the parachutist to control at will the outlet velocity of the air through the annular vent as well as the direction of flow of the air filaments. Thus, in the fully open condition shown in FIG. 4, it will be noted from the arrows such as 12 that the main air flow is effected in a vertically upward direction through the central opening of the outlet cone. This condition is used primarily for easing the impact on opening of the canopy. In the fully closed condition of FIG. 5 on the other hand the airflow is prevented from issuing through the center of the outlet cone and is forced in a radial outward direction to issue through a series of laterally directed vent outlets 27 later described in further detail, so as to impart increased lift to the canopy. It is found that with this arrangement the descent velocity can be decreased and increased at will over a range in the ratio of three to one. It will be understood that the variations in descent velocity depend substantially exclusively on the variations in volume outlet flow rate of air as determined by the operation of control line 26.

In a desirable modification of this embodiment there may be provided two control halyards 26a, 26b each acting separately on a respective half of the running loop 22. This will make it possible to introduce asymmetry into the outlet flow of air through the outlet cone so as to influence the angle and direction of descent in addition to speed of descent.

In certain applications the horizontally projected area of the central conical sail section 6 may be made quite small. Thus as indicated in the embodiment of FIG. 3, the parachute canopy includes in addition to the mainsail 1, a central inverted cone sail 6a of very small radius, and an intervening annular vent section of relatively large radial width. In this case it may be desirable to provide the free intermediate sections of the tapes 9 bridging the annular vent with isolating sheaths or coverings 20, of suitable fabric e.g. rayon, to avoid destructive heating due to friction of the tapes or ropes 9 against the canopy fabric on unfurling of the parachute. Such covering sheaths should be provided long enough to make allowance for the elastic elongation in the tapes or ropes 9 on opening impact.

In embodiments such as that shown in FIG. 3 where the annular vent has a large radial width, it may also be desirable to provide an additional annular reinforcing tape 6b positioned between the tapes 10 and 8 and connected to the tape sections 9 at the cross-over points therewith.

In the modification partly shown in FIG. 6, the means for assembling an outlet cone 16 with a canopy mainsail 1 includes a clasp 30 as the means for connecting loops 2b formed at the projecting ends of the peripheral shroud-tapes 2a with similar loops 14b formed at the projecting ends of tapes 29 of the outlet cone. It will be noted that the periphery 10a of the outlet cone 16 is spaced from the periphery 10 of the annular vent.

FIG. 7 partially illustrates details of the means for mounting the outlet cone 16 to an annular mainsail 1 as shown in FIG. 2 and as earlier described.

In accordance with a desirable modification, as earlier mentioned, the airflow may be substantially improved through the provision of laterally directed vents acting as high-lift nozzles and provided in the form of fabric panels 27 (see FIG. 8). As shown in FIG. 9, there is provided what is in effect a three-stage parachute, including an uppermost stage 31 constituted by a pilot or extractor parachute 31, an intermediate-stage parachute 32 provided with an outlet cone and central and peripheral shroud lines which in turn are attached, as by way of a ring 15 earlier described, to the center of the outlet cone of a main or third-stage parachute according to the invention. The intermediate-stage parachute 32 is provided with annular vent means and high-lift laterally directed vents of the type shown in FIGS. 4, 5 and 8. The main-stage parachute 33 also is of the general type heretofore described, having laterally directed vents 27 both in its canopy and in its outlet cone. In such a multi-stage parachute system, air issuing at high speed from the center of the outlet cone 16 of the main parachute 33 is discharged in a high-velocity upward stream to the under surface of the canopy of the intermediate-stage parachute 32, and similarly the smaller, high-speed airstream from the center of the outlet cone of parachute 32 may be fed to the small upper-stage pilot parachute 31, if positioned closed enough. The effectiveness of the intermediate- and upper-stage parachutes, and that of the system as a whole, will thus be considerably improved.

It will also be noted in the embodiment of FIG. 9 (as indicated above) that the main parachute 33 includes first flaps 27 at the periphery of the outlet cone 16 defining first high-lift nozzle means between the periphery of said outlet cone and the surface of the mainsail 1, and further flaps 27 in a radially intermediate section of the mainsail defining further high-lift nozzle means positioned radially outward and below the first nozzle means.

In cases where the outlet cone 16 is of relatively large extent, as in the embodiment of FIGS. 4–5 and in the case of the main parachute 33 of FIG. 9, and especially when high-lift flaps such as 27 are provided as in both cases just referred to, additional lines or halyards such as 28 are preferably provided for connecting an intermediate circumference of the outlet cone, e.g. just above the flaps 27 thereof, to the central or apical portion of the inverted-cone central sail 6, as illustrated.

The laterally directed vents or nozzles provided by flaps such as 27 in a parachute according to the invention, in addition to their high-lift function described, may also serve as means for steering the parachute during descent. That is, through selective closure of one or more of the lateral vents defined by flaps 27 on one side of the canopy, the reaction force of the air jet discharged from the nozzles remaining open will tend to propell the parachute towards the side at which the nozzles were closed, thus imparting to the parachute an angular or inclined descent path in a desired direction, both the direction and to some extent the angle of the glide path being controllable by the user.

This aspect of the invention is illustrated in FIGS. 11 and 12. The parachute shown in those figures includes an annular mainsail canopy section, an inverted-conical central sail section 6, separated from the mainsail by an annular vent 12a, and an outlet cone 16. As in the embodiments earlier described, there are outer shroud lines 2 extending from the periphery of the mainsail, inner shroud lines 3 connected to the apical part of central sail 6, and there are halyards 18 forming extensions of the tapes 14 assembling the gores of the outlet cone 16, the halyards 18 converging to a loop or ring 15 having a connection 19 to extractor means, not shown (or to an auxiliary parachute such as 32 in FIG. 9).

In this embodiment the canopy is provided with a plurality of laterally directed vents which, as will presently be described in detail, are all so oriented as to produce a resultant thrust in a predetermined direction, which may thus be termed "aft" of the parachute. This is the side of the parachute visible in FIG. 10, and the under side as shown in FIG. 11. A parachute so constructed will, during descent, glide at an angle to the vertical. As shown in FIGS. 10 and 11, the directional stability of such descent may be improved by the provision of lateral stabilizer surfaces attached e.g. to the upper part of the outer shroud lines 2 preferably adjacent the canopy.

The laterally directed vents shown include large-section apertures all directed generally in the rearward direction as above defined, and including paired nozzle opening such as 31 and 31–I and 32. Also shown are a pair of large-area openings 33 of generally triangular form which increase the propulsive thrust while improving the aspect ratio of the parachute.

Means are provided for providing the parachute user with means for controlling to an appreciable extent the direction of the glide path of the parachute, so that the parachutist is able to make turns. For this purpose, two of the afore-mentioned apertures, or two groups of such apertures, disposed symmetrically on opposite sides of the "fore-aft" axis of the parachute as above defined, are provided with means for independently controlling the flow section thereof. Thus, as will be apparent from FIG. 11, there is provided an adjustable aperture defined at the free edge of a flap 34 having stretched across it a closure tape 34–I. Tape 34–I is provided with an end loop 34–II, substantially at the mid point of the free edge of flap 27, to which is connected an intermediate connecting line 35. This in turn is connected to a main control line or halyard 36. Details of assembly of the above elements will be described in greater detail later. By pulling on the halyard 36 the user is able to alter the effective flow section of the nozzle aperture defined at 34. It will be understood that an arrangement similar to the one just described is provided on the opposite side of the canopy from the fore-aft axis, including a similar intermediate and main control halyards 35 and 36, as shown. Selective and differential action on the two halyards 36 to vary the degress of opening of the adjustable flaps 34, will generate pronounced turning moments making possible a substantial degree of control over the descent path of the parachute.

In greater detail, the intermediate control line 35 has its upper end attached to the loop 34–II as by knotting reinforced with a zigzag stitch. The lower end of line 35–I is similarly connected by way of a loop 35–II formed in it prior to assembly to the upper end of the main halyard 36. Intermediate line 35 is connected to the afore-mentioned stabilizer flaps which as earlier mentioned and as illustrated in FIGS. 10–11, are secured around the periphery, of the canopy mainsail, being inter-assembled laterally by means of reinforcing tapes to which the peripheral shroud lines 2 are also secured. The intermediate control lines 35 are provided with loops secured by way of zigzag stitches to the lower part of the reinforcing tape of the related stabilizer flap or fin and hence to the outer shroud line 2.

The length of the intermediate control line 35 is preferably so determined that with the canopy arranged flat as shown in FIG. 11, and with said line stretched out the nozzle or aperture 34 will be wide open. The position of the connection 35–II of the intermediate line 35 with the main control line 36 is determined with regard to the length, the main line 36 must be pulled to close the aperture 36 completely. In FIG. 10, the canopy is shown in the condition assumed when the left-hand control halyard 36 has been pulled tight while the right halyard 36 is left hanging loose, thereby to initiate a parachute turn leftward.

Each control halyard 36 is connected by way of a connecting line 36–II to the adjacent outer shroud line 2, the connecting line 36–II being provided at its ends with attachment loops 36–I and 36–III, and permitting differences of elongation as between the halyard and the shroud line. Thus, a continued pull applied to halyard 36 not only produces closure of the related vent aperture 34, as described above, but at the same time warps the canopy in a direction to enhance the turning effect. Such warping of the canopy is apparent on the left side of FIG. 10.

In this respect it should be understood that continued pull applied to the halyard 36 will ultimately be transmitted through connecting line 36–II to shroud line 2 and the connecting tape between the adjacent stabilizer flaps to which line 2 is attached, thereby bodily distorting or warping the entire canopy section considered (as shown in FIG. 10), in a sense to increase the aerodynamic retarding forces involved, in the initiation of the turn in the desired direction. It will also be understood that if the two halyards are actuated separately or differentially, the result will be a turn of the parachute in the desired direction as explained above; if on the other hand both halyards 36 are pulled simultaneously and by substantially equal amounts, so that the symmetry of airflow through the canopy apertures about the fore-aft axis is preserved, no turn will result but the lift force of the canopy will be increased. Thus such combined action on the halyards 36 provides a means of controlling the glide angle of the parachute to the vertical. Such action can even result in completely nullifying the thrust effect generated by the rearwardly directed nozzles.

In some applications, as with parachutes for dropping heavy loads, the adjustable-section vents or nozzles described above may be disposed in groups of two or more, positioned on a common radial zone or gore of the canopy mainsail, and hence operable by means of a common halyard such as 36, or/and in circumferentially spaced relation around the canopy. Certain of the vents included in this arrangement may per se be free of any section-modifying means but may be so positioned and oriented that they will close to increase the retardation effect and lift on partial distortion or warping of the canopy through continued pulling on the halyard as earlier explained.

Power means may be provided on the parachute for operating the nozzle-controlling and/or warping means described, and connected to halyards such as 36. Such power means may assume the form of power-assisted servo-control in the case of a manned parachute, or remotely controlled servo-means operable by radio link with an airborne or ground transmitter in the case of unmanned load-carrier parachutes. Various additional modifications and improvements may be introduced into the exemplary embodiments illustrated and described without exceeding the scope of the invention.

What I claim is:

1. A parachute having a canopy, said canopy comprising an annular outer canopy section in the general shape of a downwardly concave dome and a central canopy section in the general shape of an inverted cone with a downwardly directed apex, outer shrouding depending from spaced points of the outer periphery of said outer canopy section and inner shrouding depending from the apex of said central canopy section, radially extending means interconnecting the inner periphery of the outer canopy section with the outer periphery of the inner canopy section and defining between said sections an annular perforate vent zone, and an outlet cone member having its base circumference attached to the canopy around said annular vent zone and having an upwardly directed apex with an outlet vent opening therein for channeling the upward airflow issuing from the annular vent of the canopy.

2. The parachute as claimed in claim 1, including means operable during parachute descent for modifying the effective flow section area of said vent opening of the cone member.

3. A parachute, having a canopy, which canopy includes an annular outer canopy section in the general shape of a downwardly concave dome, a central canopy section in the general shape of an inverted cone with a downwardly-directed apex, outer shroud lines depending from spaced points of the outer periphery of said outer canopy section, inner shroud lines depending from the apical region of said central canopy section, means interconnecting said outer and central canopy sections and defining between said sections an annular perforate vent zone, at least a pair of vent apertures formed at circumferentially spaced points of said canopy to provide airflow along the upper canopy surface, both said vent apertures being directed so that the airflow therethrough will be discharged in jets creating thrust components in a common direction and means connected to the respective apertures and separately operable during descent for modifying the effective flow section area through said apertures whereby to control the glide path of the parachute during descent.

4. A parachute having a canopy, said canopy comprising an annular outer canopy section in the general shape of a downwardly concave dome, a central canopy section in the general shape of an inverted cone with a downwardly directed apex, outer shrouding depending from spaced points of the outer periphery of said outer canopy section, inner shrouding depending from the apex of said central canopy section, radially extending means interconnecting the inner periphery of the outer canopy section with the outer periphery of the inner canopy section and defining between said sections an annular perforate vent zone, an outlet cone member having its base circumference attached to the canopy around said annular vent zone and having an upwardly directed apex with an outlet vent opening therein for channelling the upward air flow issuing from the annular vent of the canopy, means operable during parachute descent for modifying the effective flow section area of said vent opening of the cone member, a running loop extending around the edge of said outlet vent opening and at least one control line depending from said loop and operable during descent for modifying the effective area of the vent opening.

5. A parachute having a canopy, said canopy comprising an annular outer canopy section in the general shape of a downwardly concave dome, a central canopy section in the general shape of an inverted cone with a downwardly directed apex, outer shrouding depending from spaced points of the outer periphery of said outer canopy section, inner shrouding depending from the apex of said central canopy section, radially extending means interconnecting the inner periphery of the outer canopy section with the outer periphery of the inner canopy section and defining between said sections an annular perforate vent zone, an outlet cone member having its base circumference attached to the canopy around said annular vent zone and having an upwardly directed apex with an outlet vent opening therein for channelling the upward air flow issuing from the annular vent of the canopy, means operable during parachute descent for modifying the effective flow section area of said vent opening of the cone member, means attached to the edge of said outlet vent opening and operable during descent for modifying both the effective flow section area thereof and the shape of the opening so as to modify the direction of airflow therethrough.

6. A parachute having a canopy, said canopy comprising an annular outer canopy section in the general shape of a downwardly concave dome, a central canopy section in the general shape of an inverted cone with a downwardly directed apex, outer shrouding depending from spaced points of the outer periphery of said outer canopy section, inner shrouding depending from the apex of said central canopy section, radially extending means interconnecting the inner periphery of the outer canopy section with the outer periphery of the inner canopy section and defining between said sections an annular perforate vent zone, an outlet cone member having its base circumference attached to the canopy around said annular vent zone and having an upwardly directed apex with an outlet vent opening therein for channelling the upward airflow issuing from the annular vent of the canopy, means operable during parachute descent for modifying the effective flow section area of said vent opening of the cone member, a running loop extending around the edge of said outlet vent opening, and a pair of control lines depending from opposite points of said loop and separately operable during descent for asymmetrically modifying the shape of said vent opening so as to modify correspondingly the direction of the airflow through the vent opening.

7. A parachute, having a canopy, which canopy includes an annular outer canopy section in the general shape of a downwardly concave dome, a central canopy section in the general shape of an inverted cone with a downwardly directed apex, outer shroud lines depending from spaced points of the outer periphery of said outer canopy section and inner shroud lines depending from the apical region of said central canopy section, means interconnecting said outer and central canopy sections and defining between said sections an annular perforate vent zone, a plurality of laterally directed vent apertures spaced circumferentially of the canopy and providing airflow along the upper surface thereof, said apertures being directed to provide a resultant airflow reaction thrust operative to impart a lateral propulsive component to the parachute during descent, and means for modifying the effective flow section area of at least one of said laterally directed vent apertures during descent.

References Cited by the Examiner

UNITED STATES PATENTS

| 2,577,048 | 12/1951 | Taylor | 244—145 |
| 2,764,375 | 9/1956 | Lemoigne | 244—145 |
| 3,104,857 | 9/1963 | Knacke et al. | 244—145 |

FOREIGN PATENTS

| 405,623 | 8/1943 | Italy. |
| 467,884 | 6/1937 | Great Britain. |

MILTON BUCHLER, *Primary Examiner.*

FERGUS S. MIDDLETON, *Examiner.*